United States Patent
Morris

(10) Patent No.: US 8,301,324 B2
(45) Date of Patent: Oct. 30, 2012

(54) WOBBLE COMPENSATION OF AN ENCODER SPEED SIGNAL FOR AN ELECTRIC MOTOR

(75) Inventor: Robert L. Morris, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 38 days.

(21) Appl. No.: 13/004,360

(22) Filed: Jan. 11, 2011

(65) Prior Publication Data

US 2012/0179316 A1    Jul. 12, 2012

(51) Int. Cl.
*B60L 9/00* (2006.01)

(52) U.S. Cl. .............. 701/22; 701/1; 701/13; 701/24; 701/36; 701/74; 318/52; 318/432; 318/400.04; 318/400.02; 318/162; 180/65.265; 180/65.23; 180/65.235; 180/65.22; 477/14; 477/15; 477/3

(58) Field of Classification Search ........... 701/1, 22, 701/24, 36, 74, 75, 79, 91, 93, 94, 96, 110, 701/121, 13; 318/52, 432, 400.02, 162, 139, 318/400.04; 180/65.265, 65.23, 65.25, 65.235, 180/65.22; 477/14, 15, 3
See application file for complete search history.

(56) References Cited

U.S. PATENT DOCUMENTS

| | | | | |
|---|---|---|---|---|
| 4,879,754 | A * | 11/1989 | Tadashi et al. | 388/809 |
| 4,941,098 | A * | 7/1990 | Yasukawa et al. | 701/93 |
| 5,528,931 | A * | 6/1996 | James et al. | 73/114.05 |
| 7,197,390 | B2 * | 3/2007 | Yuan et al. | 701/93 |
| 7,418,361 | B2 * | 8/2008 | Yun | 702/145 |
| 2002/0116100 | A1* | 8/2002 | Shimazaki et al. | 701/22 |
| 2004/0181323 | A1* | 9/2004 | Yuan et al. | 701/22 |
| 2011/0029178 | A1* | 2/2011 | Kawakami et al. | 701/22 |
| 2011/0101899 | A1* | 5/2011 | Manabe | 318/400.04 |
| 2011/0106360 | A1* | 5/2011 | Wu et al. | 701/22 |

\* cited by examiner

*Primary Examiner* — Tuan C. To
*Assistant Examiner* — Jelani Smith
(74) *Attorney, Agent, or Firm* — Quinn Law Group, PLLC

(57) ABSTRACT

A vehicle includes a traction motor, a transmission, a speed encoder for the motor, and a control system. The control system compensates for angular wobble in an encoder signal. The control system receives, via a hybrid control processor (HCP), the encoder signal from the speed encoder, and determines a set of wobble characteristics of the encoder signal below a threshold motor speed. The control system also calculates a wobble-compensated speed value via the HCP using the wobble characteristics, and uses the wobble-compensated speed value as at least part of the input signals when controlling the motor. A lookup table tabulates a learned wobble value relative to the angular position value, and a learned wobble value is subtracted from a current angular wobble value to generate an error-adjusted wobble value. A method compensates for wobble in the encoder signal using the above control system.

14 Claims, 1 Drawing Sheet

WOBBLE COMPENSATION OF AN ENCODER SPEED SIGNAL FOR AN ELECTRIC MOTOR

TECHNICAL FIELD

The present invention relates to wobble compensation of an encoder speed signal of the type used for measuring the rotational speed of an electric motor.

BACKGROUND

Battery electric vehicles, extended-range electric vehicles, and hybrid electric vehicles all use a rechargeable high-voltage battery as a source of electrical power. One or more high-voltage electric motors alternately draw power from and deliver power to the battery during vehicle operation. When the vehicle is propelled solely using electricity from the battery, the powertrain operating mode is typically referred to as an electric-only (EV) mode. Depending on the vehicle design, additional operating modes may include fixed gear modes and electrically variable transmission (EVT) modes in which an internal combustion engine is used to generate at least some of the torque needed for propelling the vehicle.

Within a hybrid vehicle control architecture, a speed encoder measures the rotational speed of a traction motor in the form of a digital pulse train. However, due to certain physical anomalies the encoder signal does not represent the true rotational speed of the traction motor. Instead, a variation pattern repeats itself with each revolution of the motor. This variation pattern is referred to as angular wobble, and it may have characteristics that contain multiple harmonics of the base revolution period.

SUMMARY

Accordingly, a vehicle is provided herein that includes a control system having a motor control processor (MCP) and a hybrid control processor (HCP). The control system is configured to compensate for angular wobble at high speeds, i.e., where the frequency content of the wobble is much higher than the sampling frequency of the HCP, by averaging the output over a calibrated sampling period as described below. This enables wobble compensation to be performed in the HCP rather than the MCP.

In addition to the control system, the vehicle includes an electric traction motor, a transmission, and a speed encoder. The speed encoder measures a rotational speed of the traction motor, and transmits the rotational speed as an encoder signal directly to the HCP. The encoder signal is a digital pulsed output, i.e., a pulse train, with a frequency that is dependent upon the motor's rotational speed. The control system is configured to control an operation of the traction motor using a set of input signals.

The control system receives, via the HCP, the encoder signal from the speed encoder. Below a threshold motor speed, the HCP adaptively "learns" the particular wobble characteristics of the encoder signal. The control system calculates a wobble-compensated speed value via the HCP using the learned wobble characteristics, and uses the wobble-compensated speed value as at least part of the input signals to control an operation of the traction motor.

The above features and advantages and other features and advantages of the present invention are readily apparent from the following detailed description of the best modes for carrying out the invention when taken in connection with the accompanying drawings.

DESCRIPTION

Figure 1:
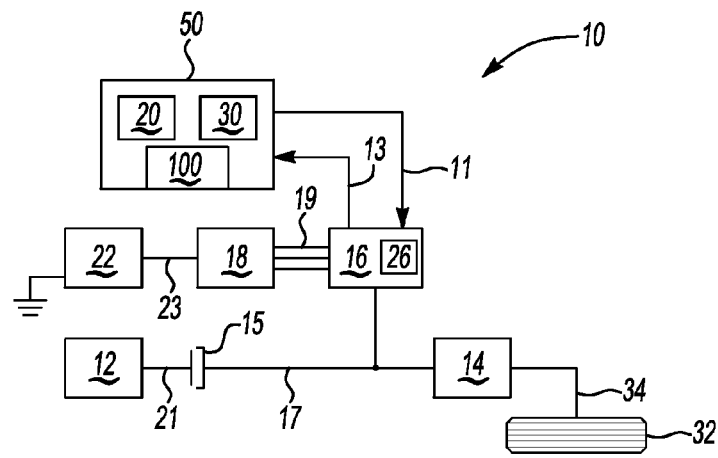
FIG. 1 is a schematic illustration of a vehicle having a control system configured to compensate for angular wobble in a speed encoder signal.

Referring to the drawings, wherein like reference numbers correspond to like or similar components throughout the several figures, FIG. 1 shows a vehicle 10 having a transmission 14. The vehicle 10 may be configured as a hybrid electric vehicle or a battery electric vehicle capable of being propelled in an electric-only (EV) mode using a traction motor 16. While one traction motor 16 is shown for simplicity in FIG. 1, those of ordinary skill in the art will appreciate that other vehicle embodiments may include an additional motor, e.g., a motor directly connected to the output of the transmission 14.

The vehicle 10 includes a control system 50 having a hybrid control processor (HCP) 20 and a motor control processor (MCP) 30. As understood by those of ordinary skill in the art, an HCP such as the present HCP 20 coordinates inputs to the transmission 14 based on the current hybrid operating strategy. Inputs may include an internal combustion engine 12 and the motor(s) 16, or just the motor(s). An MCP such as the MCP 30 is usually provided for the control of each motor that is used as part of the vehicle powertrain, with the MCP being lower in an overall control hierarchy relative to the HCP 20. In other words, the MCP 30 acts as directed via signals from the HCP 20, with the HCP providing upper level control functionality and coordination of multiple vehicle control modules (not shown), e.g., a battery control module, an engine control module, etc.

Within the control system 50, an encoder signal (arrow 13) from a speed encoder 26 is transmitted in the form of a digital pulse train into, and read directly by, the HCP 20. The HCP 20 then executes an algorithm 100 as explained below with reference to FIG. 3 to automatically compensate for angular wobble in the encoder signal (arrow 13), with the HCP ultimately controlling the traction motor 16 via a set of input signals (arrow 11). Non-transient/tangible memory of the control system 50 can be used to store the algorithm 100, which is then automatically executed by associated hardware and software components of the control system as needed.

The control system 50 may be embodied as a server or a host machine, i.e., one or multiple digital computers or data processing devices, each having one or more microprocessors or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, and any required input/output (I/O) circuitry and devices, as well as signal conditioning and buffering electronics. While shown as a single device in FIG. 1 for simplicity and clarity, the various elements of control system 50 may be distributed over as many different hardware and software components as are required to optimally control the traction motor 16.

In a typical control system, motor speed is measured and filtered at the MCP level. The motor speed value is then transmitted to the HCP. Under such an approach, filtering of the motor speed value within the MCP is needed to avoid signal aliasing. However, filtering of a motor speed value in the MCP in the conventional manner may introduce a phase lag. Moreover, serial data transmission between MCP and HCP may introduce a delay due to synchronization of communication between the two processors. This in turn may render inaccurate any speed derivative signal calculation occurring within the HCP, thus providing less than optimal vehicle driveline performance.

Therefore, relative to a reading and filtering of the encoder signal (arrow 13) via the MCP 30, the present control system 50 processes the encoder signal (arrow 13) via the HCP 20 to reduce delay between the time the traction motor 16 changes speed and the time that the speed change is available for HCP computation. Because direct speed calculation in the HCP 20 results in an average speed over the calculation period, additional filtering in the HCP is generally not required.

The vehicle 10 shown in FIG. 1 may include a high-voltage energy storage system (ESS) 22, e.g., a multi-cell rechargeable battery. A power inverter module (PIM) 18 may be electrically connected between the ESS 22 and the traction motor 16 via a high-voltage AC bus 19, and used to convert AC power from the motor to DC power for storage in the ESS and vice versa. A high-voltage DC bus 23 may be electrically connected between the PIM 18 and the ESS 22. A DC-DC power converter (not shown) may also be used as needed to increase or decrease the level of DC power to a level suitable for use by various DC-powered vehicle systems.

In some vehicle designs, the engine 12 may be used to selectively generate engine torque via an engine output shaft 21. Torque from the engine output shaft 21 can be used to either directly drive a transmission input member 17, and thus to propel the vehicle 10, e.g., in a hybrid electric vehicle design, or to power an electric generator (not shown) in an extended-range electric vehicle design. An input clutch and damper assembly 15 may be used to selectively connect/disconnect the engine 12 from the transmission 14. Input torque is ultimately transmitted from the traction motor 16 and/or the engine 12 to a set of drive wheels 32 via an output shaft 34 of the transmission 14.

The traction motor 16 may be a multi-phase permanent magnet/AC induction machine rated for approximately 60 volts to approximately 300 volts or more depending on the vehicle design. Thus, the term "high voltage" as used herein is relative to the various 12-volt auxiliary systems used aboard the vehicle 10. The ESS 22 may be selectively recharged using torque from the traction motor 16 when the motor is actively operating as generator, e.g., by capturing energy during a regenerative braking event. In some embodiments, such as plug-in hybrid, the ESS 22 can be recharged via an off-board power supply (not shown) whenever the vehicle 10 is not running Referring to FIG. 2, the control system 50 of FIG. 1 is shown in terms of its basic logic flow. The speed encoder 26 first measures or emulates the rotational speed of the traction motor 16, and then transmits the speed as the emulated encoder signal (arrow 13) in the form of a digital pulse train. A virtual switch 42 can be actuated or cycled to provide a calibrated sample duration for the digital pulse train. Once the calibrated period expires, a pulse count "time stamp" of a portion of the encoder signal (arrow 13) is automatically recorded via the control system 50, and the time stamp is then transmitted as time-stamped signals (arrow 113) to a processing module 44.

At all speeds of the traction motor 16, the processing module 44 processes the time-stamped signals (arrow 113) and outputs a raw speed value (arrow 45) and an angular position value (arrow 47) as control signals. At low motor speeds only, i.e., at speeds below a calibrated threshold, the processing module 44 also outputs an angular wobble value (arrow 49) as another control signal. Of these values, the angular position value (arrow 47) is directly recorded in a lookup table (LUT) 52, which tabulates a learned wobble value (arrow 53) relative to the currently measured angular position. Also recorded in the LUT 52 is an updated wobble value (arrow 62), which is determined as an error value with respect to the learned wobble value (arrow 53).

With respect to the LUT 52, this table is automatically referenced by the control system 50 during execution of algorithm 100 in order to select, from the LUT, the previously recorded learned wobble value (arrow 53). The learned wobble value (arrow 53) is then fed back to a processing node 48, where it is subtracted from the current angular wobble value (arrow 49). An error-adjusted wobble value (arrow 149) from node 48 is then multiplied by a calibrated gain at block 60, with the updated wobble value (arrow 62) fed from block 60 to the LUT 52. In this manner, the control system 50 continuously or periodically updates the LUT 52 by learning and responding to the wobble characteristics presented by the encoder signal (arrow 13 of FIG. 1).

The raw speed value (arrow 45) from the processing module 44 is fed into a processing node 46, where it is combined with the learned wobble value (arrow 53) extracted from the LUT 52. The output of node 46 is referred to herein as the wobble-compensated speed value (arrow 54). The signal transmitting this value is used as at least part of the input signals (arrow 11) (see FIG. 1) when controlling an operation of the traction motor 16 shown in the same Figure.

Figure 2:
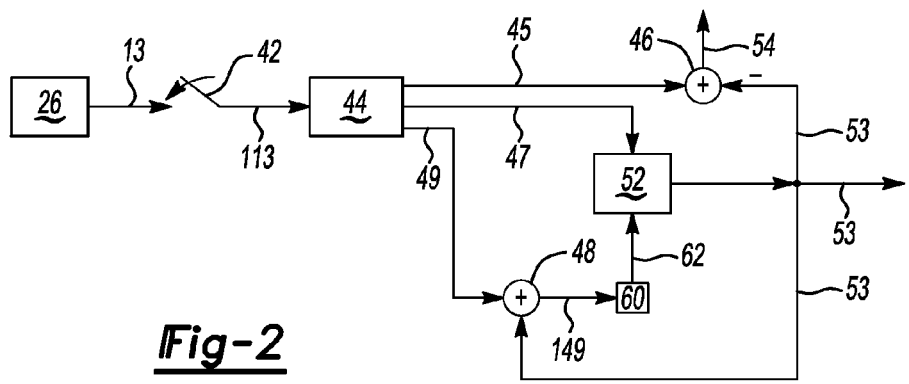
FIG. 2 is a logic flow diagram for the control system of the vehicle shown in FIG. 1.
Figure 3:
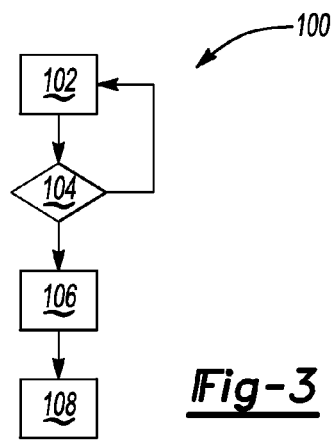
FIG. 3 is a flow chart describing a method for compensating for angular wobble in the speed encoder signal aboard the vehicle shown in FIG. 1.

Referring to FIG. 3, the algorithm 100 is shown in one possible embodiment. Beginning with step 102, and with reference to the structure and logic flow shown in FIGS. 1 and 2, respectively, the speed encoder 26 is used to emulate the rotational speed of the traction motor 16. Step 102 may entail generating the pulse train noted above, actuating the virtual switch 42 of FIG. 2 to provide a calibrated sampling interval, reading the resultant time stamp describing the latest encoder pulse train, and automatically counting the number of pulses since the previous reading.

Step 102 may further include subtracting the time stamp from the previous reading to determine a delta time value, and then dividing the pulse count by the delta time value. The number of pulses per revolution of the motor 16 is then used to convert the result to revolutions per minute (RPM). Doing this is the equivalent of averaging the instantaneous speed of each pulse train from the speed encoder 26 over a calibrated speed measurement time interval.

Step 102 may also include determining the angular position of the traction motor 16 relative to an initialized or zeroed position. The position of the traction motor 16 may be determined as a function of the number of pulse counts. At initialization, the count position may be initialized to a value of 1. At each subsequent encoder speed measurement, the pulse count since the previous measurement can be added to the previous count position to determine the current count position. When the current count position equals or exceeds the number of pulses per revolution, the current count position may be "wrapped" by subtracting the number of pulses per revolution from the current count position. When all of the aforementioned steps are completed, the algorithm 100 proceeds to step 104.

At step 104, the control system 50 automatically determines if conditions exist to enable adaptive "wobble learning" functionality of algorithm 100. Such conditions may include an RPM speed of the traction motor 16 falling within a threshold range, an RPM rate of change below a corresponding threshold, a motor torque magnitude below a maximum threshold, etc. If enabled, the algorithm 100 proceeds to step 106, otherwise the algorithm repeats step 102.

At step 106, the control system 50 determines the true speed of the fraction motor 16 of FIG. 1. Step 106 may entail determining the number of measurements per revolution (L) by dividing the time per revolution by the time per sample, and then rounding down. Step 106 then includes determining the speed and position at time (k–L) and time (k–L–1), with the variable (k) being the current sample. The speed and position values may be determine, in one possible embodiment, via lookup from corresponding speed and position buffers. The speed and position is also determined for one revolution prior in time, e.g., by interpolating between the speed and position at times (k–L) and (k–L–1). Then, a time stamp one revolution prior in time is determined by the control system 50. This too may be achieved by interpolating the time stamps with the current position between the time stamps and position at times (k–L) and (k–L–1).

Step 106 may also entail determining the change in speed per revolution by subtracting the speed one revolution prior in time from the current speed. The average speed over the prior revolution can be calculated by subtracting the time stamp one revolution prior from the current time stamp, dividing the result into the pulse count per revolution, and then converting this value to RPM. The true speed can then be determined, e.g., by adding 50% of the change in speed per revolution to the average speed over the prior revolution. The algorithm 100 then proceeds to step 108.

At step 108, the control system 50 determines the error-adjusted wobble value (arrow 149 of FIG. 2). This may be achieved by subtracting the current true speed from the current speed measurement, and normalizing the wobble speed to the base speed by dividing the average speed over the prior revolution and multiplying by the base speed. The error-adjusted wobble value (arrow 149) can then be used as set forth above with reference to FIG. 2, in conjunction with the LUT 52, to determine the required adjustment to the LUT. Thus, the control system 50 automatically updates the LUT 52 with interpolation based on any learned wobble characteristics.

The algorithm 100 is thus executed to learn and compensate for angular wobble, i.e., cyclical variation, in emulated and encoded speed measurements transmitted from the speed encoder 26 shown in FIG. 1, such as any variation caused by imperfections in the physical speed sensing hardware of such an encoder. This approach allows for a relatively clean speed measurement without filtering-induced phase lag. Wobble-induced error may be reduced, e.g., from approximately 400 RPM peak-to-peak to less than 4 RPM depending on the embodiment.

Referring again to FIG. 2, to automatically compensate for angular wobble, the learned wobble value (arrow 53) may be played back with interpolation between points, and then subtracted from the raw speed value (arrow 45) provided by the speed encoder 26 to obtain the wobble-compensated speed value (arrow 54). At higher motor speeds, the wobble frequency content is higher than the sampling frequency of the HCP 20 (see FIG. 1). The learned wobble value (arrow 53) is thus sampled at a rate corresponding to the speed measurements from the speed encoder 26. The encompassed points may be averaged before being subtracted from the raw speed value (arrow 45) in order to obtain the wobble-compensated speed value (arrow 54). For proper wobble compensation, the same speed measurement process is applied to the learned wobble signal playback.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
an electric traction motor;
a transmission which is selectively powered by the traction motor to thereby propel the vehicle in an electric-vehicle (EV) operating mode;
a speed encoder configured to measure a rotational speed of the traction motor, and to transmit the measured rotational speed as an encoder signal; and
a control system configured to compensate for angular wobble in the encoder signal, the control system including a hybrid control processor (HCP) and a motor control processor (MCP), wherein the HCP coordinates, at a first hierarchical level, inputs to the transmission based on the current hybrid operating strategy, and, and wherein the MCP controls an operation of the traction motor, at a second hierarchical level that is lower than that of the first hierarchical level, using a set of input signals, wherein the control system is further configured to:
receive, via the HCP, the encoder signal directly from the speed encoder;
determine a set of wobble characteristics of the encoder signal only when the measured rotational speed is below a threshold motor speed;
calculate a wobble-compensated speed value, solely via the HCP, using the set of wobble characteristics;
transmit the wobble-compensated speed value to the MCP; and
use the wobble-compensated speed value as at least part of the input signals when controlling the motor via the MCP.

2. The vehicle of claim 1, wherein the control system automatically interpolates the wobble characteristics via the HCP between a set of points, and subtracts the interpolated wobble characteristics from the rotational speed of the traction motor to thereby obtain the wobble-compensated speed value.

3. The vehicle of claim 1, wherein the control system uses a virtual switch to generate a pulse count time stamp of the encoder signal over a calibrated sampling interval.

4. The vehicle of claim 1, wherein the control system processes the pulse count time stamp, and outputs a raw speed value, an angular position value, and a current angular wobble value.

5. The vehicle of claim 4, wherein the control system includes a lookup table (LUT) that tabulates a learned wobble value relative to the angular position value, and subtracts the learned wobble value from the current angular wobble value to generate an error-adjusted wobble value, and wherein the learned wobble value is sampled at a rate corresponding to the encoder signal from the speed encoder.

6. The vehicle of claim 5, wherein the error-adjusted wobble value is multiplied, via the HCP, by a calibrated gain constant and fed into the LUT along with the angular position value to thereby update the LUT.

7. The vehicle of claim 5, wherein the raw speed value is combined with the learned wobble value from the LUT to thereby generate the wobble-compensated speed value.

8. A method for compensating for angular wobble in an encoder signal from a speed encoder aboard a vehicle having a control system, wherein the vehicle includes a transmission that is selectively powered by an electric traction motor, the method comprising:

using the speed encoder to measure a rotational speed of the traction motor, and to directly transmit the rotational speed to a hybrid control processor (HCP) of the control system as an encoder signal, wherein the HCP coordinates inputs to the transmission based on a current hybrid operating strategy;

receiving, via the HCP, the encoder signal directly from the speed encoder;

determining a set of wobble characteristics of the encoder signal below a threshold motor speed of the traction motor;

calculating a wobble-compensated speed value solely via the HCP using the wobble characteristics;

transmitting the calculated wobble-compensated speed value from the HCP to a motor control processor (MCP); and using the wobble-compensated speed value as at least part of a set of input signals to thereby control the traction motor via the MCP, wherein the MCP is at a lower hierarchical level of the control system than the HCP.

9. The method of claim 8, further comprising:

automatically interpolating, via the HCP, the wobble characteristics between a set of points; and subtracting the interpolated wobble characteristics from the rotational speed of the traction motor via the HCP to obtain the wobble-compensated speed value.

10. The method of claim 8, further comprising:

using a virtual switch to generate a pulse count time stamp of the encoder signal over a calibrated sampling interval.

11. The method of claim 10, further comprising:

processing the pulse count time stamp via the control system to thereby generate a raw speed value, an angular position value, and a current angular wobble value.

12. The method of claim 10, further comprising:

referencing a lookup table (LUT) via the control system, wherein the LUT tabulates a learned wobble value and the angular position value.

13. The method of claim 12, further comprising:

subtracting, via the HCP, the learned wobble value from the current angular wobble value to thereby generate an adjusted wobble value;

multiplying the adjusted wobble value by a calibrated gain constant to produce an updated wobble value; and recording the updated wobble value and the angular position value in the LUT.

14. The method of claim 12, further comprising:

combining the raw speed value with the learned wobble value from the LUT to thereby generate the wobble-compensated speed value.

* * * * *